US009016646B2

(12) United States Patent  
Hung

(10) Patent No.: US 9,016,646 B2  
(45) Date of Patent: Apr. 28, 2015

(54) DISPLAY SUPPORTING APPARATUS

(71) Applicant: Modernsolid Industrial Co., Ltd., Taichung (TW)

(72) Inventor: Chin-Jui Hung, Taichung (TW)

(73) Assignee: Modernsolid Industrial Co., Ltd., Taichung (TW)

( * ) Notice: Subject to any disclaimer, the term of this patent is extended or adjusted under 35 U.S.C. 154(b) by 168 days.

(21) Appl. No.: 13/762,514

(22) Filed: Feb. 8, 2013

(65) Prior Publication Data

US 2014/0054431 A1 Feb. 27, 2014

(30) Foreign Application Priority Data

Aug. 22, 2012 (TW) .............................. 101216161 U

(51) Int. Cl.
*E04G 3/00* (2006.01)
*F16M 13/02* (2006.01)
*F16M 11/10* (2006.01)
*F16M 11/20* (2006.01)

(52) U.S. Cl.
CPC ........... *F16M 13/022* (2013.01); *F16M 11/105* (2013.01); *F16M 11/2064* (2013.01); *F16M 13/027* (2013.01); *F16M 2200/044* (2013.01); *F16M 2200/065* (2013.01)

(58) Field of Classification Search
CPC . F16M 11/105; F16M 11/06; F16M 11/2064; F16M 13/027; F16M 13/022; F16M 2200/044; F16M 2200/065

USPC .............. 248/324, 274.1, 288.31, 276.1, 917, 248/919, 284.1, 278.1, 222.52; 361/679.21, 361/679.22

See application file for complete search history.

(56) References Cited

U.S. PATENT DOCUMENTS

| 5,975,472 | A  | * | 11/1999 | Hung ......................... 248/278.1 |
| 6,367,756 | B1 | * | 4/2002  | Wang ......................... 248/278.1 |
| 6,874,743 | B2 | * | 4/2005  | Watanabe et al. .......... 248/276.1 |
| 7,207,537 | B2 | * | 4/2007  | Hung ......................... 248/284.1 |
| 7,338,022 | B2 | * | 3/2008  | Hung ......................... 248/278.1 |
| 7,364,127 | B2 | * | 4/2008  | Huang ....................... 248/276.1 |
| 7,380,760 | B2 | * | 6/2008  | Dittmer ..................... 248/278.1 |
| 8,733,722 | B2 | * | 5/2014  | Hung ......................... 248/276.1 |
| 2005/0230585 | A1 | * | 10/2005 | Hung ......................... 248/278.1 |

* cited by examiner

*Primary Examiner* — Todd M Epps  
(74) *Attorney, Agent, or Firm* — Whyte Hirschboeck Dudek S.C.

(57) ABSTRACT

A display supporting apparatus is connected to a display, and includes: a mounting member formed with a through hole extending through inner and outer side surfaces thereof along an axis; a pivoting member having a pivot portion abutting against the outer side surface of the mounting member and aligned with the through hole; a connecting unit including a positioning ring abutting against the inner side surface of the mounting member and aligned with the through hole, and a plurality of connecting members extending through the through hole to interconnect the positioning ring and the pivot portion, such that the mounting member is rotatable relative to the pivoting member about the axis; and a supporting member connected to and supporting the pivoting member.

9 Claims, 6 Drawing Sheets

DISPLAY SUPPORTING APPARATUS

CROSS-REFERENCE TO RELATED APPLICATION

This application claims priority of Taiwanese Application No. 101216161, filed on Aug. 22, 2012.

BACKGROUND OF THE INVENTION

1. Field of the Invention

This invention relates to a supporting apparatus, and more particularly to a display supporting apparatus.

2. Description of the Related Art

Taiwanese Patent Publication No. M354685 discloses a display supporting apparatus that can allow the display to rotate about only a horizontal axis. That is, the display cannot rotate about a vertical axis. Furthermore, the display is fixed at a desired position by engaging a positioning pin in a selected one of a plurality of positioning holes, thereby resulting in inconvenience during operation.

SUMMARY OF THE INVENTION

The object of this invention is to provide a display supporting apparatus that is constructed so as to allow the display to be adjusted easily to and stopped automatically at any desired position.

According to this invention, a display supporting apparatus is adapted to connect with a back surface of a display for supporting the display, and includes: a mounting member including an inner side surface, an outer side surface opposite to the inner side surface, and a through hole extending through the inner and outer side surfaces along a first axis; a pivoting member including a first pivot portion abutting against the outer side surface of the mounting member and aligned with the through hole; a connecting unit including a positioning ring abutting against the inner side surface of the mounting member and aligned with the through hole, and a plurality of connecting members extending through the through hole to interconnect the positioning ring and the first pivot portion, such that the mounting member is rotatable relative to the pivoting member about the first axis; and a supporting member connected to and supporting the pivoting member.

Preferably, the pivoting member further includes a second pivot portion connected pivotally to the supporting member, such that the pivoting member is rotatable relative to the supporting member about a second axis perpendicular to the first axis. As such, the display can be adjusted to any desired position.

Preferably, the display supporting apparatus further includes a torsion spring that has a first end abutting against a wall of the mounting member defining the through hole, a second end abutting against the supporting member, and a coiled section interconnecting the first and second ends and disposed in the pivoting member. The torsion spring is designed so as to allow the display to stop automatically at the desired position.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
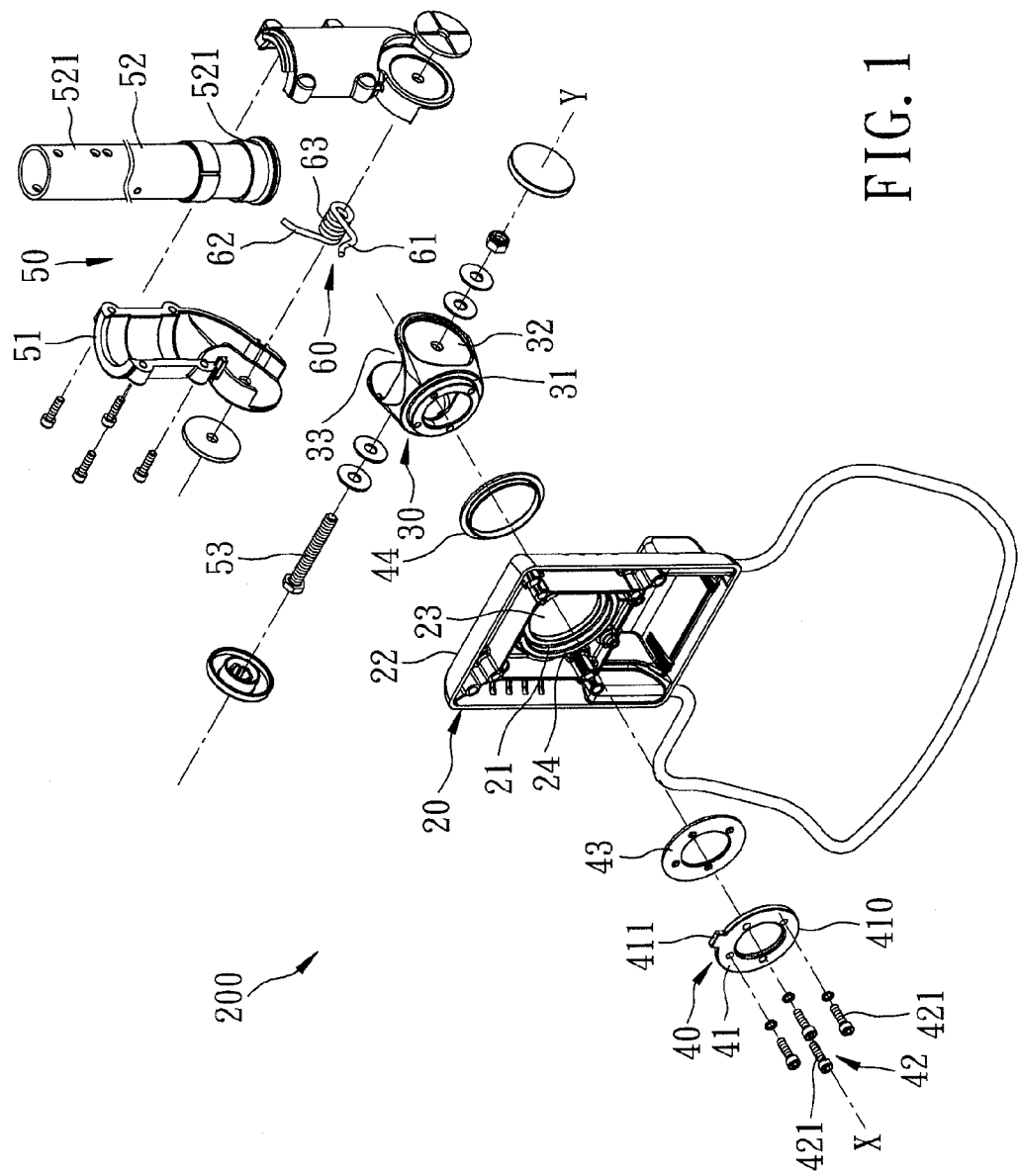
FIG. 1 is a perspective view of the preferred embodiment of a display supporting apparatus according to this invention.
Figure 2:
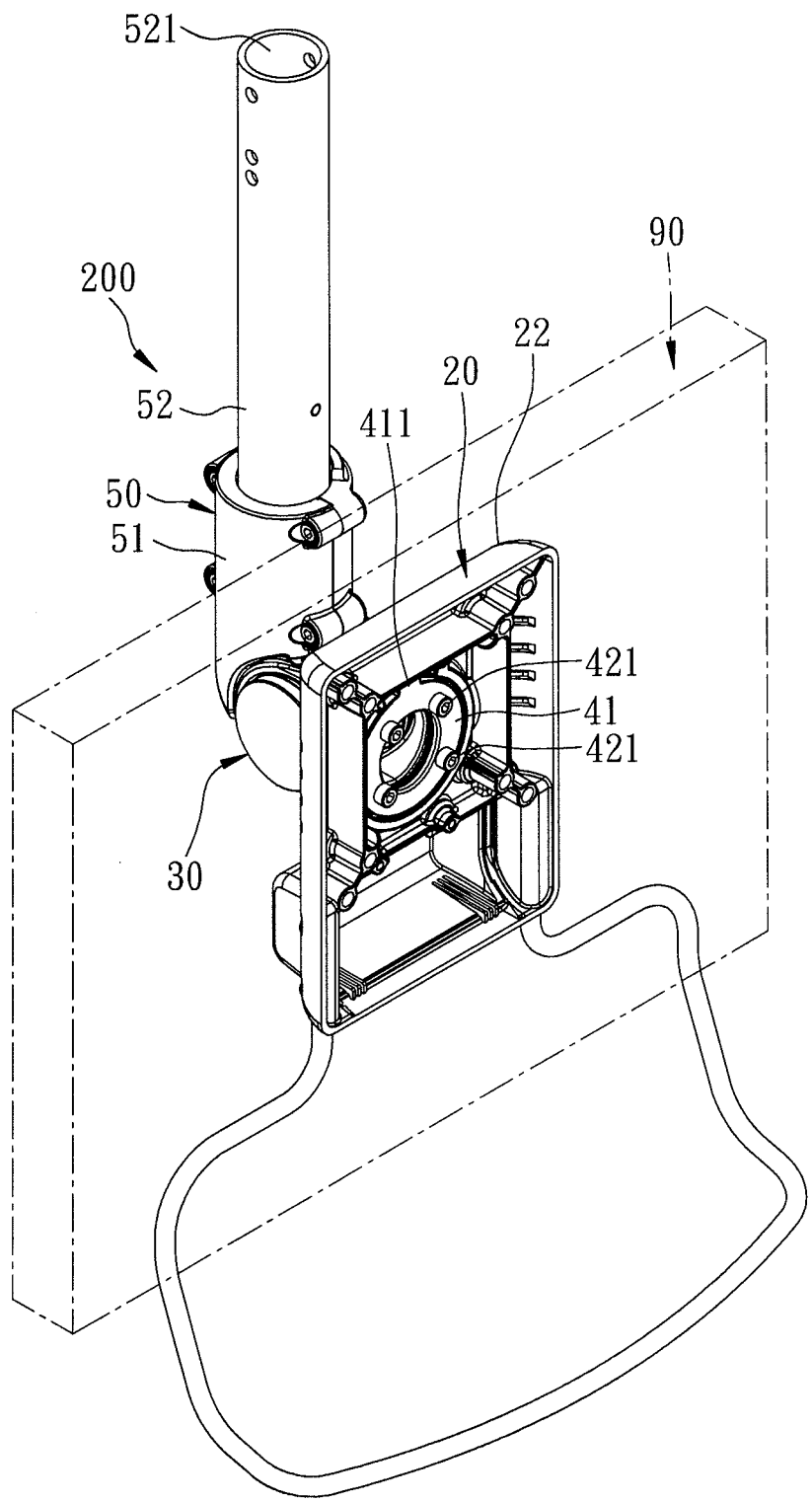
FIG. 2 is a schematic perspective view of the preferred embodiment, illustrating that the display supporting apparatus is connected to a back surface of a display.
Figure 3:
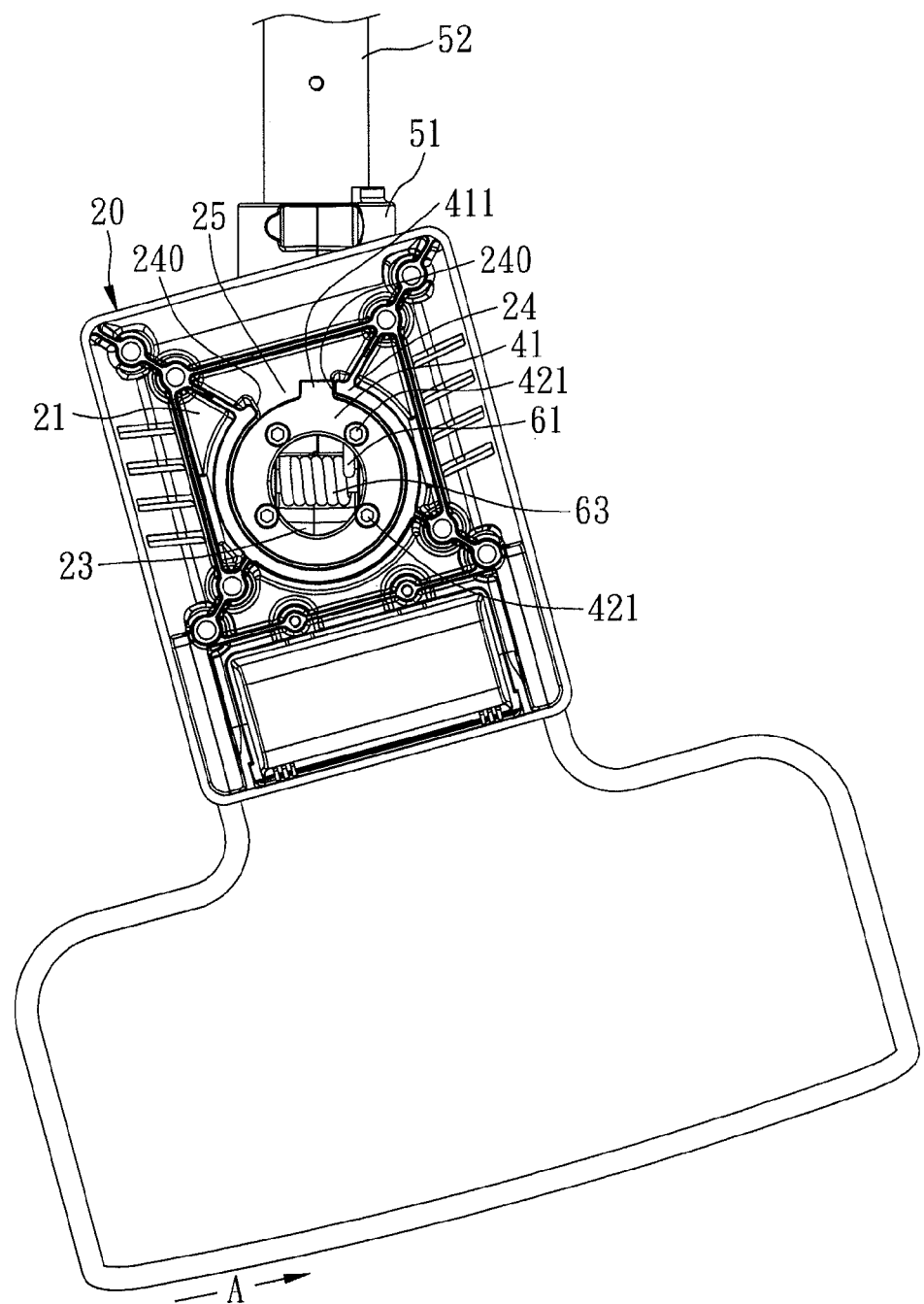
FIGS. 3 and 4 are schematic views of the preferred embodiment, illustrating that the rotational angle of a mounting member relative to a pivoting member is limited.

Referring to FIGS. 1, 2, and 3, the preferred embodiment of a display supporting apparatus 200 according to this invention is adapted to connect with a back surface of a display 90 for supporting the display 90. The display supporting apparatus 200 includes a mounting member 20, a pivoting member 30, a connecting unit 40, a supporting member 50, and a torsion spring 60.

The mounting member 20 includes an inner side surface 21, an outer side surface 22 opposite to the inner side surface 21, a through hole 23 extending through the inner and outer side surfaces 21, 22 along a first axis (X), and a rib unit 24 extending from the inner side surface 21 and disposed around and adjacent to an end of the through hole 23. The rib unit 24 has two spaced-apart ends 240 defining a limiting opening 25 therebetween.

In this embodiment, the ends 240 of the rib unit 24 are angularly spaced apart from each other by 30°. Alternatively, the ends 340 of the rib unit 24 may be angularly spaced apart from each other by 45° or 60°.

The pivoting member 30 includes a first pivot portion 31 abutting against the outer side surface 22 of the mounting member 20 and aligned with the through hole 23, a second pivot portion 32 connected to the first pivot portion 31 such that the first and second pivot portions 31, 32 are arranged along the first axis (X), and an internal space 33 extending through the first and second pivot portions 31, 32 along the first axis (X).

With particular reference to FIGS. 1, 2, 3, and 5, the connecting unit 40 includes a positioning ring 41 abutting against the inner side surface 21 of the mounting member 20 and aligned with the through hole 23, a plurality of connecting members 42 extending through the through hole 23 and interconnecting the positioning ring 41 and the first pivot portion 31, a first washer 43 disposed between the inner side surface 21 of the mounting member 20 and the positioning ring 41, and a second washer 44 disposed between the outer side surface 22 of the mounting member 20 and the pivoting member 30. The mounting member 20 is rotatable relative to the pivoting member 30 about the first axis (X).

Figure 4:
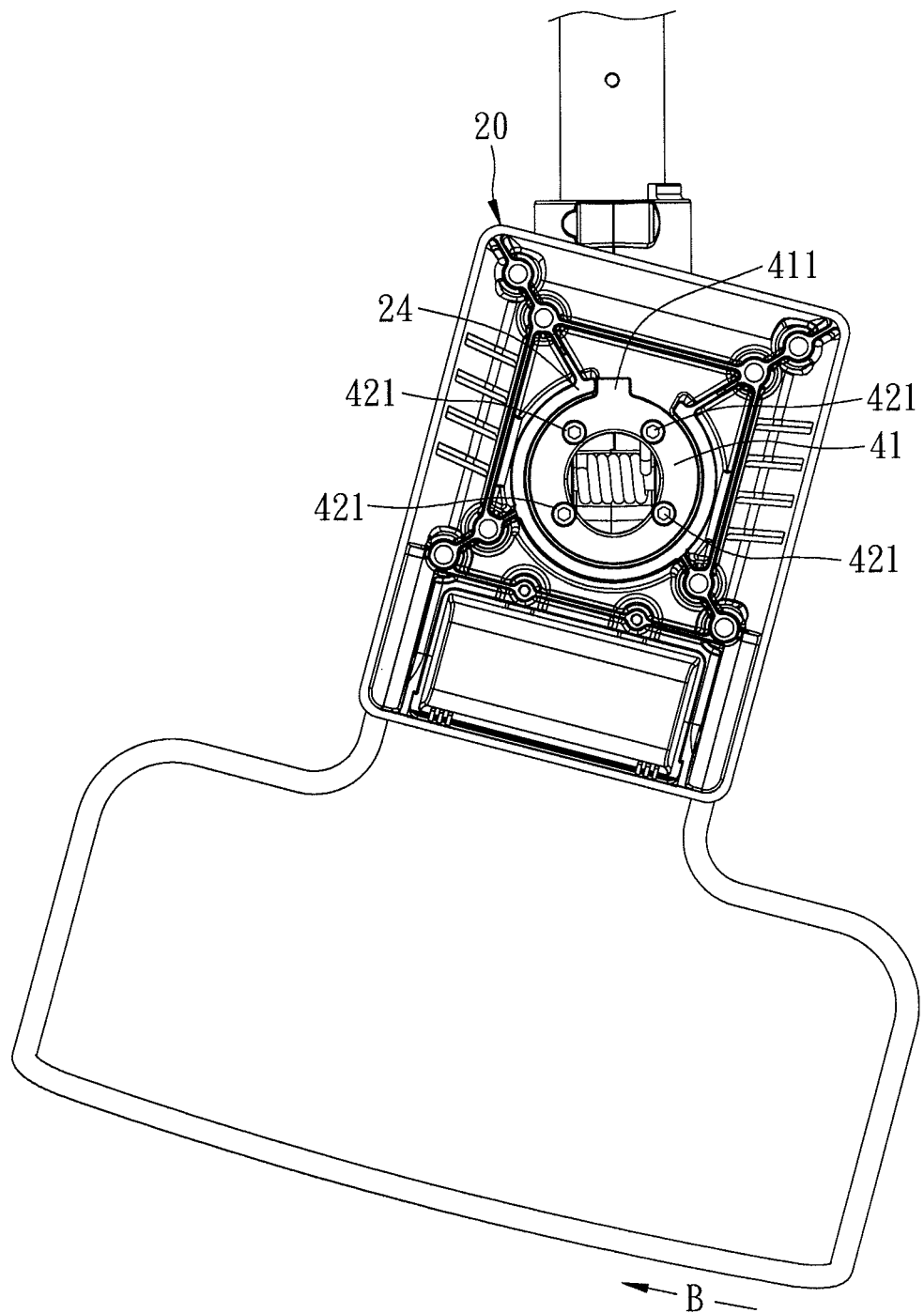

The positioning ring 41 includes a ring body 410 and a stop portion 411 extending radially and outwardly from the ring body 410. When the mounting member 20 rotates relative to the pivoting member 30 in a first direction (A) (see FIG. 3), one of the ends 240 of the rib unit 24 comes into contact with the stop portion 411 to prevent further rotation of the mounting member 20 in the first direction (A). When the mounting member 20 rotates relative to the pivoting member 30 in a second direction (B) (see FIG. 4) opposite to the first direction (A), the other of the ends 240 of the rib unit 24 comes into contact with the stop portion 411 to prevent further rotation of the mounting member 20 in the second direction (B). As such, the rotational angle of the mounting member 20 is limited.

The connecting members 42 include a plurality of bolts 421 extending through the positioning ring 41, the first washer 43, and the through hole 23 to engage threadably the pivoting member 30.

The first and second washers 43, 44 are made of a plastic material so as to reduce the friction between the mounting member 20 and the positioning ring 41 and between the mounting member 20 and the pivoting member 30 when the mounting member 20 is rotated.

The supporting member 50 is connected to and supports the pivoting member 30, such that the pivoting member 30 is rotatable relative to the supporting member 50 about the second axis (Y). The supporting member 50 includes a connecting tube 51 and a supporting tube 52. The connecting tube 51 is connected pivotally to the second pivot portion 32 by a horizontal pivot pin 53. The supporting tube 52 has two opposite open ends 521 in spatial communication with said internal space 33 in the pivoting member 30. The connecting tube 51 is sleeved fixedly on one of the ends 521 of the supporting tube 52. The pivot pin 53 extends through the connecting tube 51 to engage threadably the second pivot portion 32.

The torsion spring 60 has a first end 61 abutting against a wall of the mounting member 20 defining the through hole 23, a second end 62 abutting against an inner wall surface of the supporting tube 52, and a coiled section 63 sleeved on the pivot pin 53 and interconnecting the first and second ends 61, 62 and disposed in the internal space 33 in the pivoting member 30.

Use of the display supporting apparatus 200 will now be described in the following. When the display 90 is mounted to the display supporting apparatus 200, an electrical cable 91 (see FIG. 5), e.g., power cable, is passed through the through hole 23, the internal space 33, and the supporting tube 52 to engage a power socket (not shown). In this manner, the electrical cable 91 is concealed in the display supporting apparatus 200.

When use of the display 90 is desired, the position of the display 90 can be adjusted by rotating the mounting member 20 relative to the pivoting member 30 about the first axis (X). During rotation of the mounting member 20, since the positioning ring 41 is connected fixedly to the pivoting member 30 by the bolts 421, it remains still.

Figure 5:
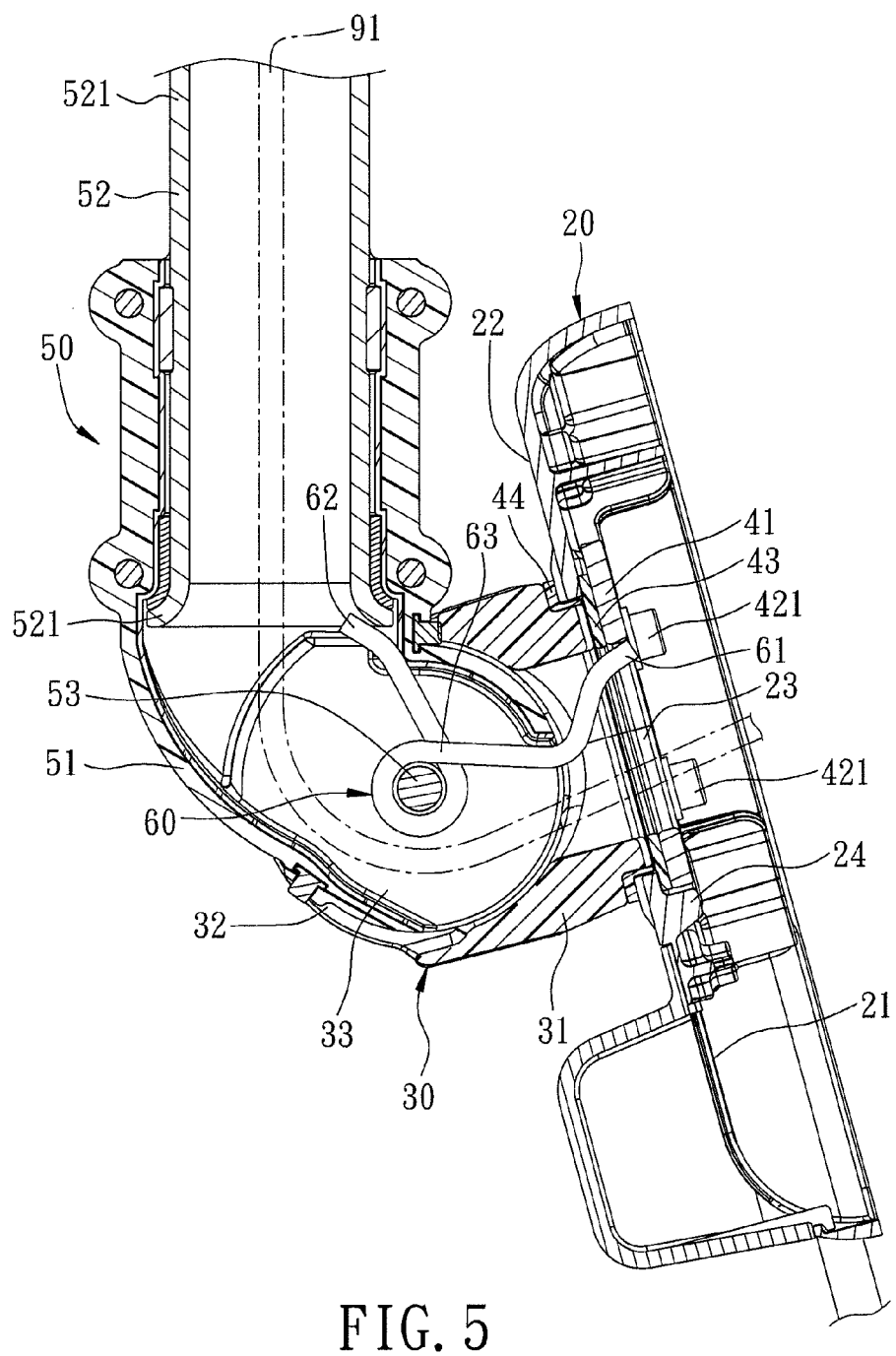
FIGS. 5 and 6 are schematic views of the preferred embodiment, illustrating that the mounting member is rotatable about a horizontal pivot pin.
Figure 6:
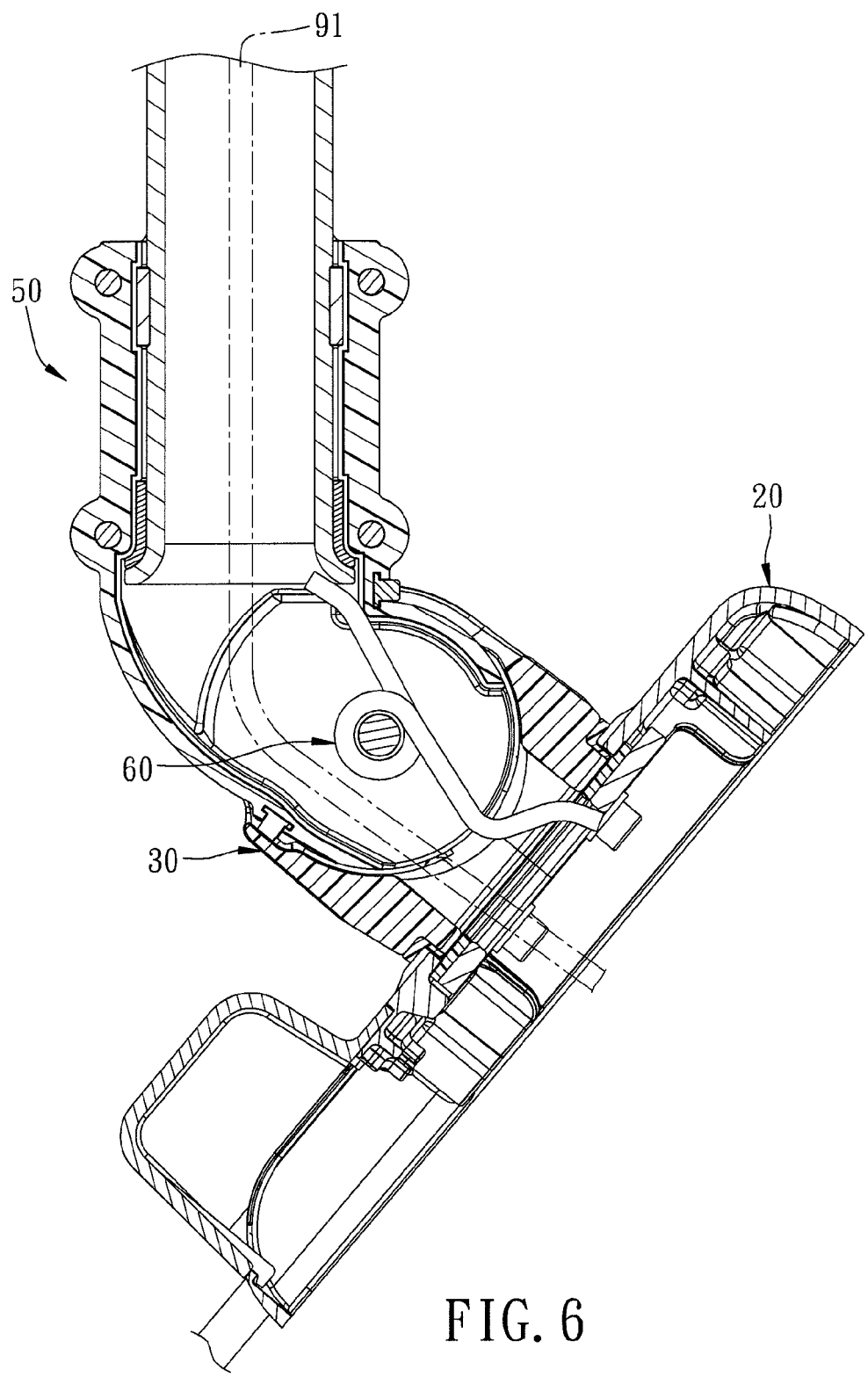

Subsequently, with further reference to FIGS. 5 and 6, the pivoting member 30 is rotated relative to the supporting member 50 about the second axis (Y). Since the second axis (Y) is perpendicular to the first axis (X), the display 90 can be adjusted to any desired position. Furthermore, due to the presence of the torsion spring 60, the display 90 can be adjusted easily to the desired position, after which the display 90 can be stopped automatically at the desired position. Thus, the object of this invention is achieved.

With this invention thus explained, it is apparent that numerous modifications and variations can be made without departing from the scope and spirit of this invention. It is therefore intended that this invention be limited only as indicated by the appended claims.

I claim:

1. A display supporting apparatus adapted to connect with a back surface of a display for supporting the display, said display supporting apparatus comprising:
    a mounting member including an inner side surface, an outer side surface opposite to said inner side surface, and a through hole extending through said inner and outer side surfaces along a first axis;
    a pivoting member including a first pivot portion abutting against said outer side surface of said mounting member and aligned with said through hole;
    a connecting unit including a positioning ring abutting against said inner side surface of said mounting member and aligned with said through hole, and a plurality of connecting members extending through said through hole to interconnect said positioning ring and said first pivot portion, such that said mounting member is rotatable relative to said pivoting member about the first axis; and
    a supporting member connected to and supporting said pivoting member,
    wherein said mounting member further includes a rib unit extending from said inner side surface and disposed around and adjacent to an end of said through hole, said rib unit having two spaced-apart ends defining a limiting opening therebetween, and
    said positioning ring includes a ring body and a stop portion extending radially and outwardly from said ring body, said stop portion extending through said limiting opening such that, during rotation of said mounting member relative to said pivoting member in a direction, when said stop portion comes into contact with one of said ends of said rib unit further rotation of said mounting member relative to said pivoting member in the direction can be prevented.

2. The display supporting apparatus as claimed in claim 1, wherein said ends of said rib unit are angularly spaced apart from each other by 30°.

3. The display supporting apparatus as claimed in claim 1, wherein said connecting unit further includes a first washer disposed between said inner side surface of said mounting member and said positioning ring, and a second washer disposed between said outer side surface of said mounting member and said pivoting member.

4. The display supporting apparatus as claimed in claim 3, wherein said connecting members includes a plurality of bolts extending through said positioning ring, said first washer, and said through hole to engage threadably said pivoting member.

5. A display supporting apparatus adapted to connect with a back surface of a display for supporting the display, said display supporting apparatus comprising:
    a mounting member including an inner side surface, an outer side surface opposite to said inner side surface, and a through hole extending through said inner and outer side surfaces along a first axis;
    a pivoting member including a first pivot portion abutting against said outer side surface of said mounting member and aligned with said through hole;
    a connecting unit including a positioning ring abutting against said inner side surface of said mounting member and aligned with said through hole, and a plurality of connecting members extending through said through hole to interconnect said positioning ring and said first pivot portion, such that said mounting member is rotatable relative to said pivoting member about the first axis; and
    a supporting member connected to and supporting said pivoting member,
    wherein said pivoting member further includes a second pivot portion connected pivotally to said supporting member and connected to said first pivot portion, such that said pivoting member is rotatable relative to said supporting member about a second axis perpendicular to the first axis, wherein said mounting member further includes a rib unit extending from said inner side surface and disposed around and adjacent to an end of said through hole, said rib unit having two spaced-apart ends defining a limiting opening therebetween, and said positioning ring includes a ring body and a stop portion extending radially and outwardly from said ring body, said stop portion extending through said limiting opening such that, during rotation of said mounting member relative to said pivoting member in a direction, when said stop portion comes into contact with said rib unit, further rotation of said mounting member relative to said pivoting member in the direction can be prevented.

6. The display supporting apparatus as claimed in claim 5, wherein said supporting member includes a supporting tube, and a connecting tube sleeved fixedly on an end of said supporting tube and connected pivotally to said second pivot portion of said pivoting member.

7. The display supporting apparatus as claimed in claim 6, wherein:
    said pivoting member has an internal space extending therethrough along the first axis and in spatial communication with said through hole in said mounting member; and
    said supporting tube of said supporting member has two opposite open ends in spatial communication with said internal space in said pivoting member;
    whereby, an electrical cable can extend through said through hole in said mounting member, said internal space in said pivoting member, and said supporting tube.

8. The display supporting apparatus as claimed in claim 7, further comprising a torsion spring that has a first end abutting against a wall of said mounting member defining said through hole, a second end abutting against an inner wall surface of said supporting tube, and a coiled section interconnecting said first and second ends and disposed in said internal space in said pivoting member.

9. The display supporting apparatus as claimed in claim 8, further comprising a pivot pin extending through said second pivot portion of said pivoting member and said supporting member and permitting said pivoting member to rotate thereabout, said coiled section of said torsion spring being sleeved on said pivot pin.

* * * * *